United States Patent [19]

Adams

[11] Patent Number: 4,607,461
[45] Date of Patent: Aug. 26, 1986

[54] ACCURATE POSITIONING APPARATUS

[76] Inventor: Charles Adams, 9735 N. Sumac, Des Plaines, Ill. 60016

[21] Appl. No.: 679,748

[22] Filed: Dec. 10, 1984

[51] Int. Cl.⁴ .............................................. B24B 49/00
[52] U.S. Cl. .................. 51/165.8; 51/289 R; 51/34 F; 51/354; 51/166 TS; 82/24 R; 82/19; 403/291
[58] Field of Search ................... 308/2 A; 51/166 TS, 51/2 Q, 2 S, 34 F, 165.8, 165.81, 165.82, 354, 289 R; 82/24 R, 19; 248/626, 630, 627, 628

[56] References Cited

U.S. PATENT DOCUMENTS

| | | | |
|---|---|---|---|
| 1,442,643 | 1/1923 | Brooks | 248/630 |
| 1,509,105 | 9/1924 | Krum | 248/626 |
| 1,938,756 | 12/1933 | Booth | 51/165.8 |
| 2,377,239 | 5/1945 | Kasen | 82/19 |
| 2,680,941 | 6/1954 | Hahn | 51/165.81 |
| 3,361,018 | 1/1968 | Druckman | 82/24 |

FOREIGN PATENT DOCUMENTS 535962 4/1941 United Kingdom .
2124523 1/1986 United Kingdom .

Primary Examiner—Harold D. Whitehead
Attorney, Agent, or Firm—Thomas R. Vigil

[57] ABSTRACT

The incremental very accurate positioning device is operable to control accurate positioning of a movable member such as a tool. The apparatus comprises a base with a mounting bar spaced from the base for mounting the member. The bar is movable along its elongate axis by a drive force applied to the proximal end thereof for moving the distal end forwardly and rearwardly along the axis. The bar is mounted on two parallel spaced elongated flat springs that extend transversely of the bar. The springs are fixed to the bar for maintaining an axial force on the bar and are mounted at each end to a block which is pivotally mounted on the base.

19 Claims, 6 Drawing Figures

ACCURATE POSITIONING APPARATUS

BACKGROUND OF THE INVENTION

1. Field of the Invention

The present invention relates to positioning devices and more particularly to a positioning device which is used to provide controlled, accurate positioning of a movable member.

2. Description of the Prior Art

Positioning devices currently utilized in positioning a member such as a tool or cutter typically include a slide, sometimes moving with a ball bearing arrangement, and a leadscrew which provides the driving force and positioning. These slides are subject to three problems which prohibit discrete movements of less than 50 millionths of an inch. These three problems are "stick-slip", "backlash" and wear of bearing surfaces.

"Stick-slip" is the tendency of the moving member of a slide to stick or freeze when stationary, due to friction between the adjacent surfaces. Although this problem is initially overcome by a ball bearing slide, wear and contamination eventually produce "stick-slip". The only recourse to this problem is to infeed an additional amount until the slide moves or to tap the slide with a hammer until it moves. When using the first method, the resulting movement is usually a lunge or jump which can be two or three times the desired movement. The tapping of the slide with a hammer, although crude, can be effective but cannot be consistently relied upon for extremely accurate positioning.

"Backlash" is the tendency of leadscrews to develop a free movement before exerting any pressure on the slide member. This is particularly true where a reverse movement is desired, such as when the member is advanced too far and a small retraction is needed. Theoretically, "backlash" occurs since clearance is required between a screw and a nut to prevent it from locking up. However, when the screw is reversed, it uses the back side of the thread and develops a "play" or "backlash" when traversing from the front side of the thread to the back side of the thread through the clearance provided. This "backlash" may seem insignificant but does prevent precise, minute incremental positioning which is frequently needed.

The third major problem with current positioning devices is the wear of the surfaces of the slide. As stated above, initial results are satisfactory, especially with a ball bearing slide. However, friction between the surfaces produces wear which eventually leads to play in the slide and an inevitable inaccurate positioning. This problem is enhanced by contamination from foreign matter which is produced by most machining operations.

Additionally, some machines must provide a means of firmly locking the slide at a given point. This is accomplished by different means but usually results in a deflection of the slide sufficient enough to cause inaccurate positioning.

Heretofore various methods and apparatus have been proposed for providing accurate positioning of a movable member. Examples of such methods and apparatus can be found in the following U.S. Patents:

| U.S. Pat. No. | PATENTEE |
| --- | --- |
| 1,122,713 | Fisher |
| 1,322,352 | Schellenbach |
| 2,065,966 | Bruning |
| 2,370,742 | Mercer |
| 2,377,239 | Kasen |
| 2,391,142 | Drake |
| 2,852,966 | Olson |
| 3,361,018 | Druckman |

The Fisher U.S. Pat. No. 1,122,713 discloses a tool adjustment for lathes. This patent discloses a slide which moves a cutting tool and has weights attached to the slide to provide an axial load on the slide which is driven by a screw feed.

The Schellenback U.S. Pat. No. 1,322,352 discloses an automatic lathe using a slide which moves a cutting tool and is driven by a screw feed.

The Bruning U.S. Pat. No. 2,065,966 discloses an elastic holder for cutting tools. This patent discloses a tool holder in which the tool can give way elastically if the tool or workpiece are in danger of being damaged or broken. The elastic member is constituted by a plate spring or by a plurality of superimposed plate springs.

The Mercer U.S. Pat. No. 2,370,742 discloses another tool holder which is capable of yielding to avoid distortion or breakage and also uses plate springs.

The Kasen U.S. Pat. No. 2,377,239 discloses a set-up and adjustment means whereby a cutting tool is moved on a slide which is driven by a cam capable of being adjusted by a screw. The slide is additionally subjected to an axial force provided by helical springs.

The Drake U.S. Pat. No. 2,391,142 discloses a tool holder which will yield to permit the tool to move from the workpiece. This yielding means is provided by a helical spring having a spring rate which may be varied to provide different tensions to control the action of the tool.

The Olson U.S. Pat. No. 2,852,966 provides a cutting tool holder which will retract from the cutting surface without marring and is capable of minute adjustments. This patent discloses a tool holder which moves along a slide subjected to a force provided by a helical spring.

The Druckman U.S. Pat. No. 3,361,018 discloses a tool holder for lathes in the form of a pair of flat parallel leaf springs having their lower edges secured to the lathe and their upper ends mounting a tool holder.

As will be described in greater detail hereinafter, the apparatus of the present invention provides a positioning device which is capable of repeated accurate positioning of a member within five millionths of an inch. This accuracy has never been achieved before and is provided in an inexpensive, dependable and more rugged apparatus which is not susceptible to the problems described above and which will continue to function in the most hostile manufacturing environments with a minimal amount of maintenance.

Moreover, the apparatus of the present invention differs from the previously proposed apparatus by providing an incremental positioning device which is not subjected to friction between surfaces, does not exhibit any free movement before positioning is started or reversed, and moves in an absolute straight line.

SUMMARY

According to the invention there is provided an apparatus for controlling accurate positioning of a movable member comprising a base, mounting means spaced from the base, at least two mounting blocks mounted on the base, and flexure means fixed transversely of and to the mounting means and fixed at each end thereof to one of the mounting blocks. The mounting means is able to move forwardly and rearwardly along an axis thereof spaced from the base and is subjected to an axial force by the flexure means.

DESCRIPTION OF THE PREFERRED EMBODIMENT

Figure 1:
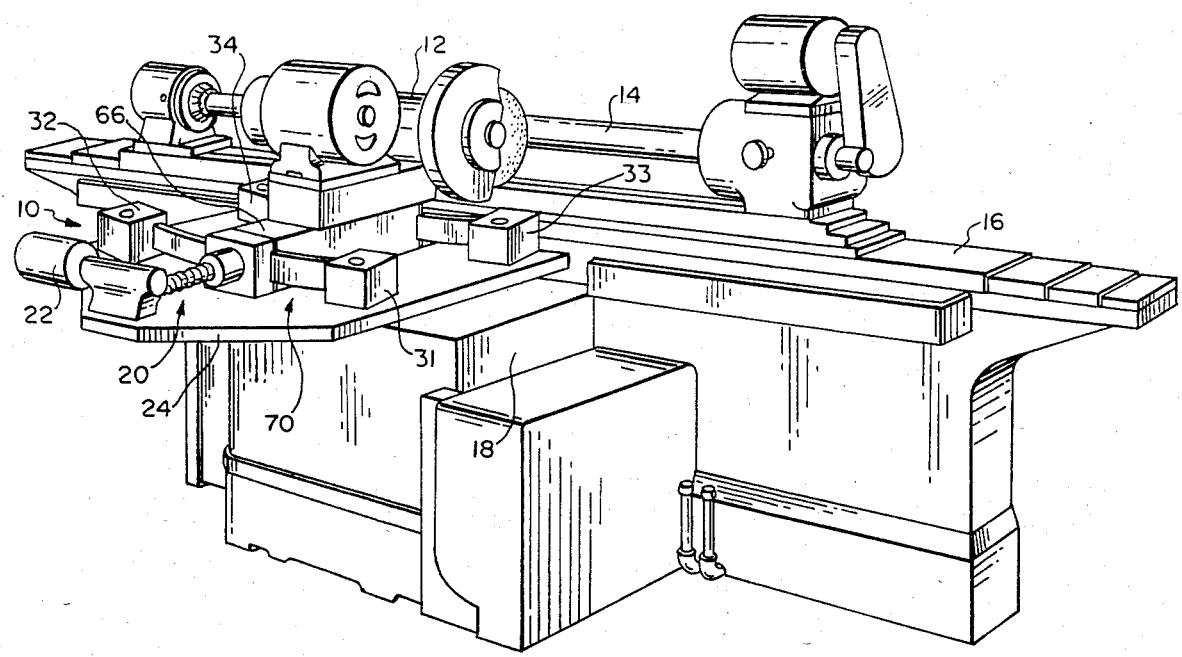
FIG. 1 is a front perspective view of a grinder attached to an accurate positioning apparatus which is constructed according to the teachings of the present invention and which is shown in conjunction with a lathe.

Referring now to the drawings in greater detail there is illustrated in FIG. 1 a very accurate positioning apparatus 10 constructed according to the teachings of the present invention which is shown with a grinder 12 mounted thereon for grinding a workpiece 14 mounted on a lathe 16.

The apparatus 10 is mounted on a pedestal 18 adjacent to, or part of, the lathe 16 and is driven by a screw feed drive 20 including a motor or gear reducer 22.

The apparatus 10 includes a base 24 on which are mounted four blocks 31–34. Each block 31–34 has a throughbore 41, 42, 43 or 44 (FIG. 2) for receiving a pin or dowel 51, 52, 53 or 54 (FIG. 2), each of which is fixed at its lower end to the base 24.

The apparatus 10 further includes a mounting bar 60 positioned for movement over the base 24 and having a proximal end 62 upon which the screw feed drive 20 acts, a distal end 64, and a top side 66 on which the grinder 12 is mounted.

The mounting bar 60 is supported for movement over the base 24 by a flexing mechanism 70 which includes two elongate curved flat plate springs 72 and 74 which are fixed at each end, respectively, to blocks 31, 32 and 33, 34. The mounting bar 60 is mounted on the flat springs 72 and 74 as will be described in greater detail below.

Figure 2:
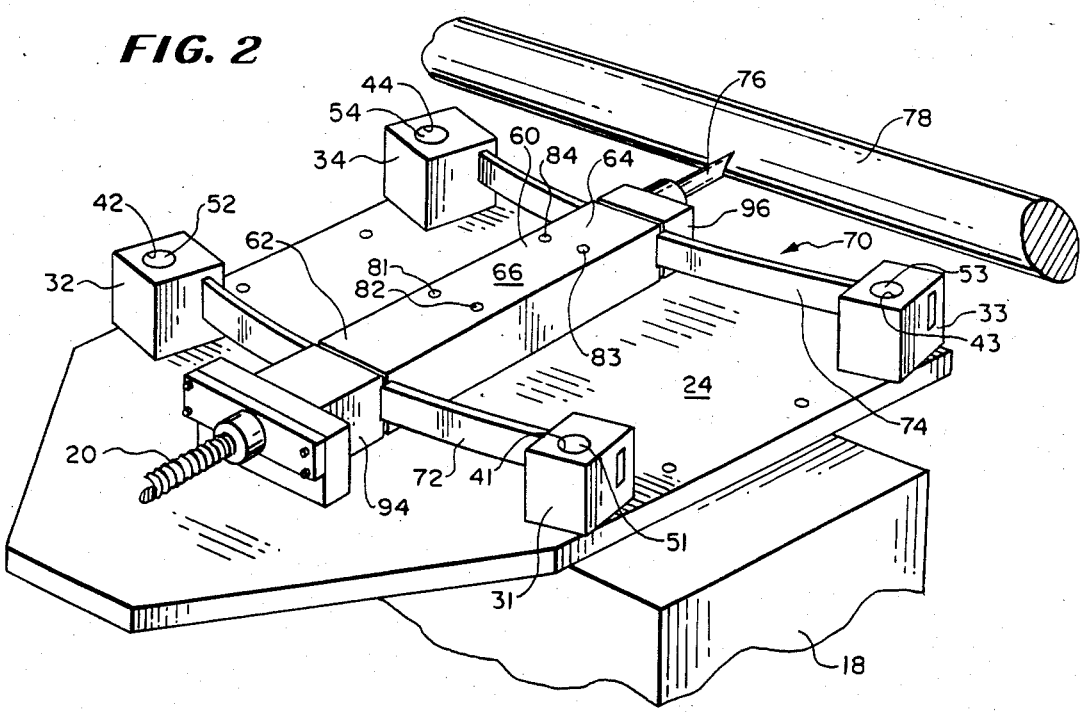
FIG. 2 is a top perspective view of one preferred embodiment of the accurate positioning apparatus of the present invention shown with a cutting tool mounted at one end of a mounting member of the apparatus.

The positioning apparatus 10 is shown in FIG. 2 with a cutting tool 76 mounted on the distal end 64 of the mounting bar 60 for cutting a workpiece 78.

The distal end 64 can have a special construction for accommodating or mounting a tool such as the cutting tool 76. Also, bolt holes 81–84 can be provided in the top side 66 of the bar 60 for mounting a machine tool such as the grinder 12 shown in FIG. 1.

Figure 3:
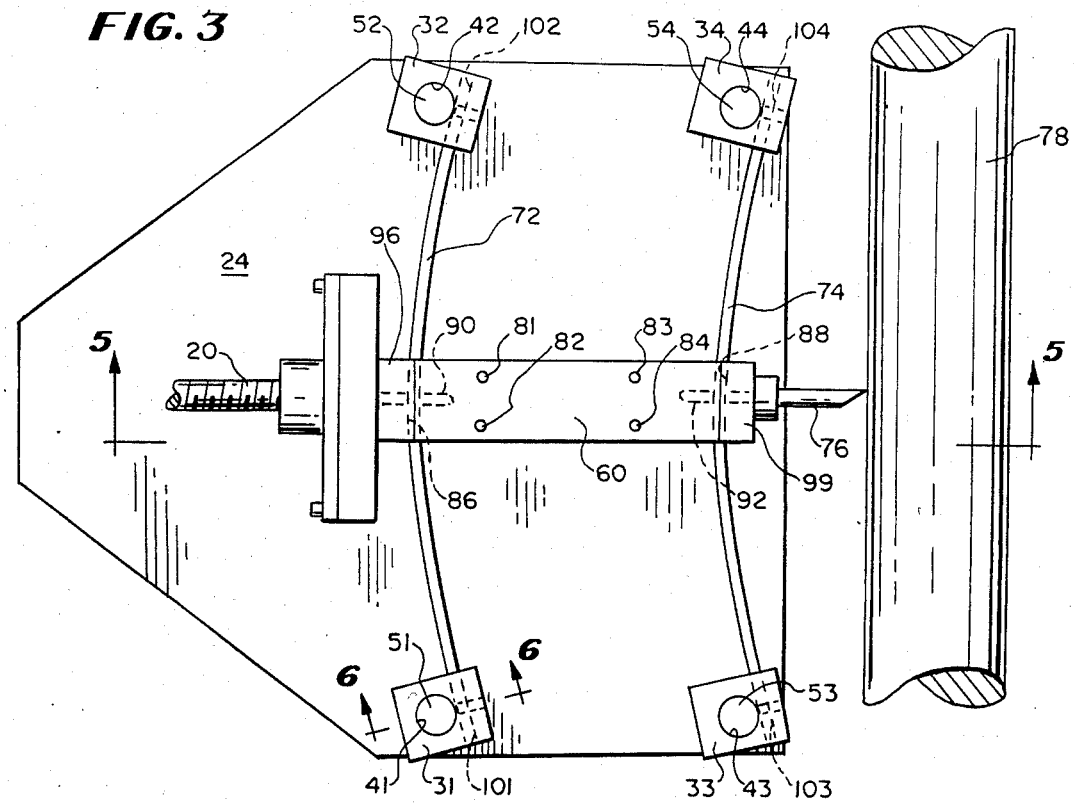
FIG. 3 is a top plan view of the apparatus shown in FIG. 2 and is shown in its at-rest position.

As shown in FIG. 3, the mounting bar 60 has two parallel spaced slots 86 and 88. The flat spring 72 is received in the slot 86 and the flat spring 74 is received in the slot 88. The flat springs 72 and 74 are fixed in proper position in and relative to the bar 60 by dowel pins 90 and 92, respectively and clamped to the bar 60 by fasteners (not shown) received through end blocks 94 and 96 as best shown in FIGS. 3 and 4.

The screw feed drive 20 acts on the end block 94 to move the mounting bar 60. This movement permits the machine tool 76 or the grinder 12 to engage or disengage the workpiece 14 or 78 to be machined. Since the mounting bar 60 is mounted suspended above the base 24, no lubrication between these two members is needed and the mounting bar 60 is not restricted by any dirt, dust, residue, etc. which may accumulate from the workpiece 14 or 78 to be machined. This method of mounting the bar 60 prevents any "stick-slip" described earlier.

Figure 6:
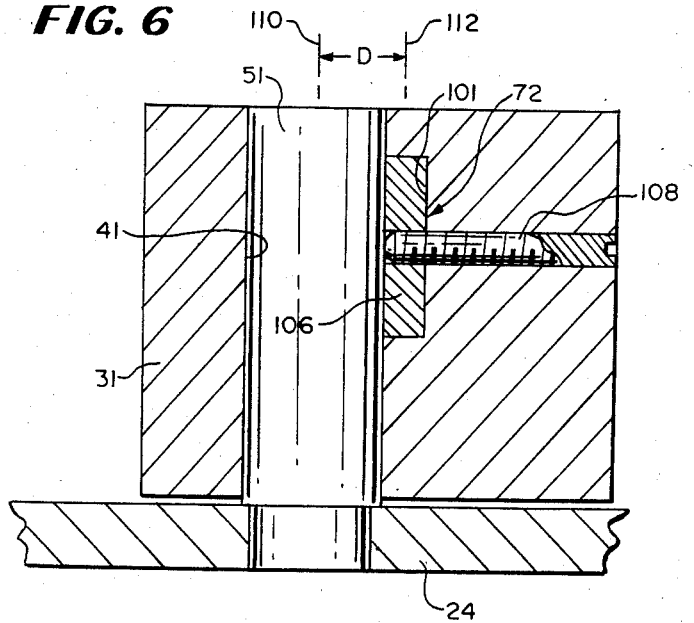
FIG. 6 is a sectional view of a mounting block of the apparatus shown in FIG. 3 and is taken along line 6—6 of FIG. 3.

Each of the blocks 31–34 has a slot 101, 102, 103 or 104 therein as best shown in FIG. 6 which is a sectional view though block 31 and shows slot 101. An end 106 of flat spring 72 is received in the slot 101 and held in place by a dowel pin 108 which can be a threaded set screw 108 as shown.

Figure 4:
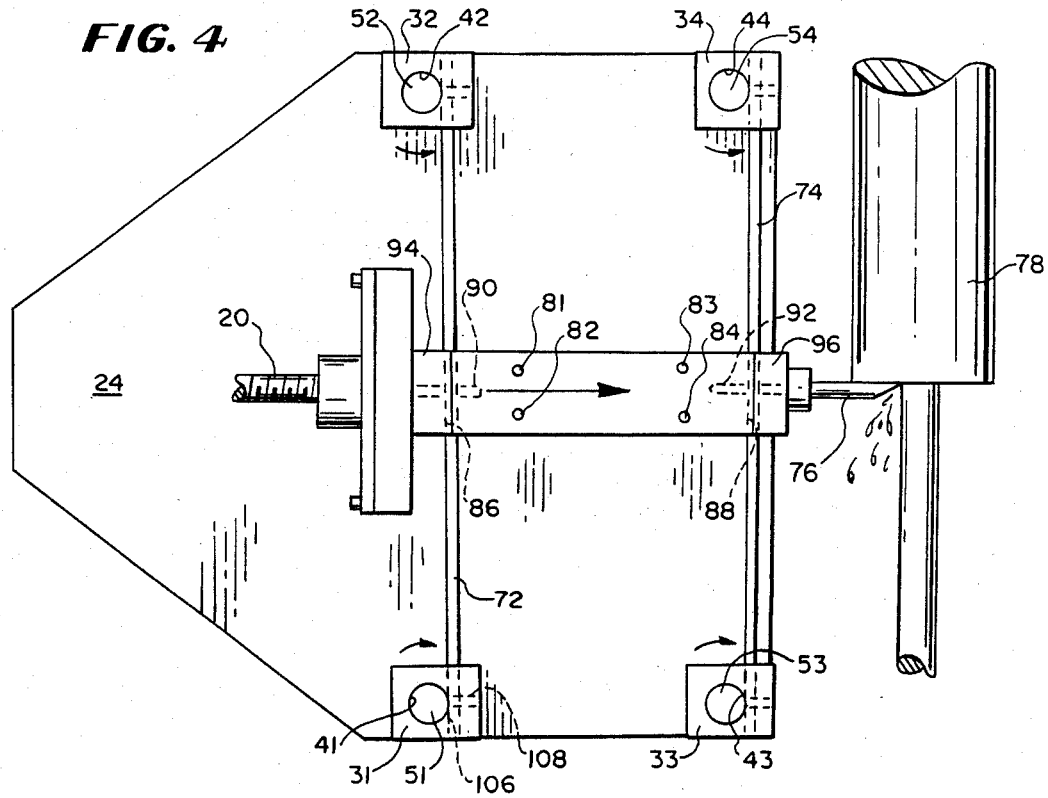
FIG. 4 is a top plan view of the apparatus in its working position.
Figure 5:
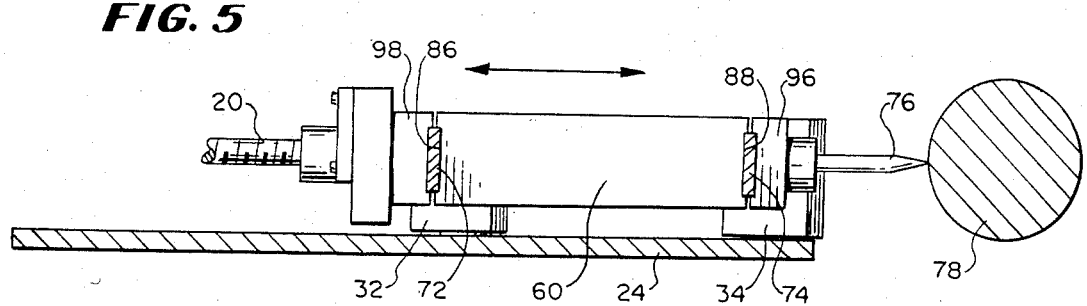
FIG. 5 is a vertical sectional view of the apparatus shown in FIG. 3 and is taken along line 5—5 of FIG. 3.

As shown in FIGS. 3 and 4, it is desirable to mount the flat flexure springs 72 and 74 in such a way as to provide an axial force on the mounting bar 60 acting on same in a direction toward the proximal end 62 of the mounting bar 60. This axial force is established by selecting springs 72 and 74 with a desired spring rate and by providing the flat springs 72, 74 with an arch pointing toward the proximal end 62 of the mounting bar 60 when the flexure springs 72 and 74 are mounted in mounting blocks 31–34. This axial force prevents backlash in the screw feed drive 20 as described earlier.

The flat flexure springs 72 and 74 can be flat leaf springs such as used in vehicle suspension systems.

The pivotal mounting of the mounting blocks 31–34 and the distance D (FIG. 6) between pivot axis 110 of pin 51 and the plane 112 of flat spring 72 (actually the center plane of slot 101) are chosen so that (a) the mounting blocks 31–34 are free to pivot about the pins 51–54 and allow the screw feed drive to move the mounting bar 60 freely against the axial force provided by the flat flexure springs 72 and 74 and (b) when the slots 86 and 88 are aligned, respectively, with mounting block slots 101, 102, and 103, 104, the flat springs 72 and 74 are straight without wrinkles or wrinkling as shown in FIG. 4.

To accomplish this the slots 101–104 may be formed further away from the respective throughbores 41–44 and may not open onto same as shown in FIG. 6.

In use, the positioning apparatus 10 is placed adjacent to an object (workpiece 14 or 78) to be machined. The screw feed drive 20 is operated to apply a driving force to the proximal end 62 of the mounting bar 60 which is moved in an absolute straight line without any lateral displacement of the mounting bar 60. The drive force, of course, must be sufficient to overcome the axial force exerted by the flexure mechanism 70 and move the machine tool (grinder 12 or cutting tool 76) to make contact with the object to be machined and machine it to a desired specification. Once this specification is achieved, the screw feed drive 20 is reversal.

Empirical tests have shown that with the tool (12 or 76) under continued pressure or axial force from the apparatus 10, very precise control of the position of the tool is obtained to a tolerance of approximately five millionths of an inch (0.000005 inch).

While the positioning apparatus 10 has been shown in conjunction with a cutting tool 76 or a grinder 12, it is to be understood that the apparatus 10 of the present invention is equally appliable to other movable members where precise controlled, accurate positioning is needed, such as in, for example, scientific instruments, pelletizer blade locating apparatus, etc.

Also, while the apparatus 10 is shown with two rectangular elongated flat springs 72 and 74, it should be understood that any number or type of flexure springs which perform the same function can be used.

From the foregoing description, it will be apparent that the apparatus 10 of the present invention has a number of advantages, some of which have been described above and others of which are inherent in the invention. Also it will be apparent that modifications can be made to the apparatus 10 without departing from the teachings of the present invention. Accordingly, the scope of the invention is only to be limited as necessitated by the accompanying claims.

I claim:

1. An apparatus for controlling accurate positioning of a movable member comprising:
    a rigid base;
    member mounting means spaced from said base for mounting a movable member, said member mounting means having an axis along which said member mounting means can be reciprocally moved, a distal end, and a proximal end which is capable of being moved by a drive force applied thereto for moving said distal end forwardly and rearwardly along said axis;
    elongate flexure means extending transversely of said member mounting means, said flexure means being fixed to said member mounting means for maintaining a force on said member mounting means in a direction along the axis of said member mounting means;
    and flexure means mounting means at each end of said flexure means for mounting each end of said flexure means to said base in a manner permitting limited movement of said ends of said flexure means whereby a member mounted to said member mounting means can be accurately positioned by a drive force applied against said proximal end of said member mounting means and against said force of said flexure means, such as to an accuracy of 10 millionths of an inch.

2. The apparatus of claim 1 wherein said member mounting means are fixed to said flexure means approximately midway between the ends of said flexure means.

3. The apparatus of claim 2 wherein each of said flat springs in an at-rest position has an arch concave away from the proximal end of said member mounting means.

4. The apparatus of claim 1 wherein said flexure means are constructed, sized and arranged to place a compressive axial force on said mounting member means toward said proximal end of said member mounting means.

5. The apparatus of claim 1 wherein said flexure means include at least two parallel spaced elongate flat springs, each end of each spring being fixed to one of said flexure means mounting means and each flat spring being fixed to said member mounting means.

6. The apparatus of claim 5 wherein each of said flat springs in an at-rest position has an arch convex toward the proximal end of said member mounting means.

7. The apparatus of claim 6 wherein each of said flexure means mounting means comprises a mounting block, each block being pivotally mounted on said base for limited movement about a fixed pivoted axis, and each end of each flat spring is mounted to one of said blocks.

8. The apparatus of claim 7 wherein the distance between said pivotal axis and the plane of the end of each flat spring mounted to one of said mounting blocks is related to the curvature of the arched flat spring in a manner which will allow said flat spring to be moved from said arched configuration thereof to a straight position thereof without wrinkling of each flat spring and with said ends of said flat springs in said mounting blocks pivoting about said pivot axes.

9. The apparatus of claim 5 wherein said member mounting means comprises a bar having two slots for receiving each of said flat springs.

10. The apparatus of claim 7 including four pivot pins each fixed at one end to said base and wherein each mounting block has a bore for receiving one of said pivot pins to enable each mounting block to pivot about one of said pivot pins.

11. The apparatus of claim 7 wherein each mounting block has a slot and the end of one of said flat springs fits into one of said slots in one of said mounting blocks and is secured thereto.

12. The apparatus of claim 1 wherein said member mounting means is adapted to mount a machine tool at said distal end thereof.

13. The apparatus of claim 1 wherein said member mounting means is adapted to mount a grinder affixed to said top side thereof.

14. The apparatus of claim 1 combined with a screw feed drive mechanism coupled to said proximal end of said member mounting means.

15. The apparatus of claim 1 wherein said flexure means comprises at least one elongate flat spring which is fixed at each end to said base in a manner permitting limited horizontal movement of said ends.

16. A positioning apparatus comprising:
    a base;
    first and second flexure mounting blocks movably affixed to said base;
    flexure means mounted to said flexure mounting blocks, said flexure means being positioned adjacent to but spaced from said base;
    member mounting means coupled to said flexure means intermediate the ends thereof in a manner which allows essentially only one degree of freedom of movement to allow reciprocating movement of said member mounting means along an axis of said mounting means which passes through proximal and distal ends of said mounting means; and
    drive means operatively coupled to the proximal end of said member mounting means to apply a drive force along the axis of said member mounting means to displace said member mounting means along the axis.

17. A method for controlling accurate positioning of a movable member comprising the steps of:
    mounting the movable member on elongate flexure means in intermediate the ends thereof, said flexure means being capable of applying a spring force to the movable member;
    positioning the flexure means adjacent to but spaced from a base;

mounting each end of the elongate flexure means to the base in a manner permitting limited pivoted movement of the ends of the elongate flexure means to allow movement of the movable member mounted on said elongate flexure means adjacent to and in a straight line parallel to the base;

and applying a drive force to a proximal end of the movable member to move same forwardly or rearwardly a precise distance.

18. The method of claim 17 wherein said precise distance is controlled within a tolerance of at least approximately ±5 millionths of an inch.

19. The method of claim 17 wherein said precise distance is controlled within a tolerance of at least approximately 10 millionths of an inch.

* * * * *

UNITED STATES PATENT AND TRADEMARK OFFICE
CERTIFICATE OF CORRECTION

PATENT NO. : 4,607,461

DATED : August 26, 1986

INVENTOR(S) : CHARLES ADAMS

It is certified that error appears in the above-identified patent and that said Letters Patent is hereby corrected as shown below:

Column 5, line 57 "mounting member" should be --member mounting--.

Signed and Sealed this

Twenty-first Day of April, 1987

Attest:

DONALD J. QUIGG

*Attesting Officer*　　　　*Commissioner of Patents and Trademarks*